United States Patent
Daniel

(10) Patent No.: US 9,262,722 B1
(45) Date of Patent: Feb. 16, 2016

(54) SYSTEM AND METHOD OF MEASURING A SOCIAL NETWORKER'S INFLUENCE ON SOCIAL NETWORKING WEBSITES

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 219 days.

(21) Appl. No.: 14/088,522

(22) Filed: Nov. 25, 2013

Related U.S. Application Data

(60) Provisional application No. 61/730,439, filed on Nov. 27, 2012.

(51) Int. Cl.
*G06N 7/02* (2006.01)
*G06N 5/04* (2006.01)

(52) U.S. Cl.
CPC ................... *G06N 5/048* (2013.01)

(58) Field of Classification Search
None
See application file for complete search history.

(56) References Cited

U.S. PATENT DOCUMENTS

| | | | | |
|---|---|---|---|---|
| 8,312,056 B1* | 11/2012 | Peng | ........... | G06Q 50/01 705/319 |
| 8,813,187 B1* | 8/2014 | Daniel | ........... | G06F 21/00 726/2 |
| 8,814,699 B1* | 8/2014 | Daniel | ........... | G07F 17/326 463/10 |
| 9,031,888 B2* | 5/2015 | Lawrence | ........... | G06Q 10/10 706/46 |
| 2007/0198510 A1* | 8/2007 | Ebanks | ........... | G06Q 30/02 |
| 2010/0119053 A1* | 5/2010 | Goeldi | ........... | G06Q 10/00 379/265.09 |
| 2011/0295626 A1* | 12/2011 | Chen | ........... | G06Q 30/02 705/7.11 |
| 2012/0290446 A1* | 11/2012 | England | ........... | G06Q 30/0282 705/27.1 |
| 2013/0041860 A1* | 2/2013 | Lawrence | ........... | G06Q 50/01 706/46 |
| 2013/0132309 A1* | 5/2013 | Kvernvik | ........... | G06N 99/005 706/12 |
| 2013/0179511 A1* | 7/2013 | Stevens | ........... | H04L 67/306 709/204 |
| 2013/0317808 A1* | 11/2013 | Kruel | ........... | H04L 51/32 704/9 |
| 2013/0346841 A1* | 12/2013 | Ahmed | ........... | H04L 67/22 715/208 |

OTHER PUBLICATIONS

Anger et al., "Measuring Influence on Twitter", 2011, pp. 1-4.*

* cited by examiner

*Primary Examiner* — Jeffrey A Gaffin
*Assistant Examiner* — Paulinho E Smith
(74) *Attorney, Agent, or Firm* — Carol N. Green Kaul, Esq.

(57) ABSTRACT

The present disclosure relates generally to a computer application software program for mobile phones, and more specifically to an application program related to social networking websites wherein an individual's influence on social networking websites can be quantified based on his/her quantitative and qualitative activity postings. A social networker may register any one or more social networking websites for which he/she is a participant and the system and method discussed herein will measure all activity postings, responses, replies, discussions, third party use of the original activity postings and the like, to generate weighted scores that are aggregated for an impact score that is reflective of the social networkers respective influence.

27 Claims, 11 Drawing Sheets

SYSTEM AND METHOD OF MEASURING A SOCIAL NETWORKER'S INFLUENCE ON SOCIAL NETWORKING WEBSITES

PRIORITY CLAIM

This patent application is a continuation-in-part of and claims priority to: U.S. Provisional Patent Application No. 61/730,439 titled "System and Method of Measuring a User's Influence in Social Networking Websites," filed Nov. 27, 2012. The entire disclosure of the afore-mentioned patent application is incorporated by reference as if fully stated herein.

FIELD OF THE INVENTION

The present disclosure relates generally to a computer application software program for mobile phones, and more specifically to an application program related to social networking websites wherein an individual's influence on social networking websites can be quantified based on his/her quantitative and qualitative activity postings. A social networker may register any one or more social networking websites for which he/she is a participant and the system and method discussed herein will measure all activity postings, responses, replies, discussions, third party use of the original activity postings and the like, to generate weighted scores that are aggregated for an impact score that is reflective of the social networkers respective influence.

SUMMARY OF THE INVENTION

Micro-blogging, online or asynchronous discussions, sharing of photos, video clips, and/or music clips are common activity postings that social networkers engage in, to which their friends, contacts, acquaintances, followers, relatives and the like (collectively "friends") may respond favorably or unfavorably by posting comments, likes, dislikes, etc. As such, many social networkers exert influence on their friends and may not be aware of how influential their activities, e.g. postings, i.e. comments, videos, blogs, TWEETS™, re-TWEETS™, replies and the like are. This invention allows social networkers to measure their social impact among their sphere of friends based on their collective activity postings on all registered social networking websites generating a final impact score. The impact score is aggregated using several factors including but not limited to the number and quality of registered social networks, participation level, responses generated to postings, comments, replies and the like. For example, a social networker who is very active on any one social networking site may still garner a higher impact score than an individual who has registered a plurality of social networking websites but has limited participation (i.e. minimal activity) on these social networks. Accordingly, it can be appreciated that if social networker fails to actively participate on the registered social networking websites the social networker will accumulate a low impact score.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

DETAILED DESCRIPTION OF THE INVENTION

Systems

Figure 1:
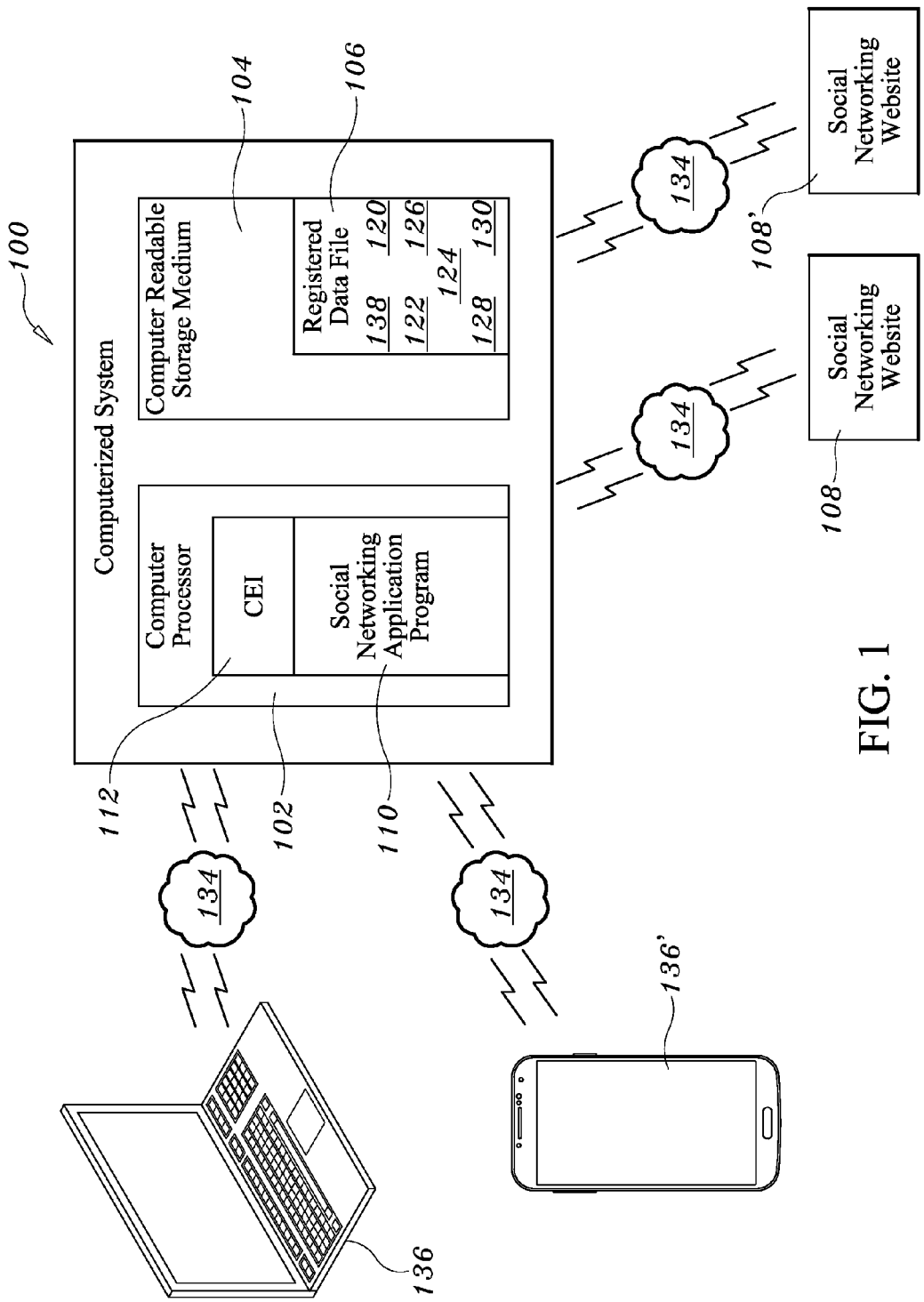
FIG. 1 shows a system in accordance with one embodiment.

FIG. 1 is an exemplary computerized system 100 according to one embodiment of the invention. System 100 comprises of a computer processor 102; a computer-readable storage medium 104 maintaining at least one registration data file 106 for receiving registration of at least one or more social networking websites 108, 108' for a social networker, for measuring the social networker's collective influence on the registered social networking websites 108, 108', said computer-readable storage medium 104 being in communication with said computer processor 102; a social networking application program 110 comprising computer executable instructions 112 readable and executable by the computer processor 102 and configured for automatically collecting empirical data regarding the social networker's use and activity level for the registered at least one or more social networking websites 108, 108' that includes, but is not limited to, measuring for example, the frequency of an activity posting 114 by the social networker to the at least one or more registered social networking websites 108, 108' within a predetermined period; determining the number of responses 116, 116' to the activity posting 114; measuring the length, quantitative and qualitative discussion 118 emanating from the social networker's activity posting 114; measuring one or more third party's use of the social networker's activity posting 114; assigning individual weighted scores for each measured quantitative and qualitative empirical data, i.e. assigning a weighted network score 120 for the number of registered social networking websites 108, 108' registered with the social networking application program 118; assigning a weighted frequency score 122 to social networker based on the measured frequency of activity posting 114, 114'; assigning a weighted response score 124 for the number of measured responses 116, 116' to the social networker's activity posting 114, 114'; assigning a weighted discussion score 126 for the measured length, quantitative and qualitative discussion 118 emanating from the social networker's activity posting 114; and assigning a weighted use score 128 for the measured use of social network's activity posting 114, 114' by third parties; generating an impact score 130 by tabulating an aggregate of the individual weighted scores 116, 116' derived from the plurality of measured empirical data; and posting the impact score 130 on a social networking website 108 viewable by the social networker and his/her community of friends 132, 132'.

Computerized system 100 includes, but is not limited to, a network enabled computer, a laptop or a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 134, local area network, wide area network such as the Internet 134, or any other type of network enabled device that may communicate over a network 134 and is configured with a computer processor 102. The computerized system 100 may also be one or more devices that are physically or logically connected to one another (such as in a cloud environment). The elements of the computerized system 100 can be included within a mobile electronic device 136, which identifies the user and provides access to the social networking websites 108, 108'. Such elements or devices include a computer-readable storage medium 104 that can comprise one or more physical devices, such as electronic storage, magnetic media storage, optical storage, etc. and various necessary elements, such as power supply interfaces, physical connections interfaces, and the like.

Computer processor 102 may be any type of processor, such as, but not limited to, a central processing unit (CPU), a microprocessor, a video processor, a front end processor, a coprocessor, a single-core central processor, a multi-core processor, and the like. Computer processor 102 may be programmed to launch the social networking application program 118 to measure social networker's activities on the registered social networking websites 108, 108' for a predetermined period. Computer processor 102 includes computer executable instructions 136 readable and executable by the at least one processor 102.

Computer executable instructions 136 are readable and executable by the computer processor 102 and are operative to perform all the necessary functions and methodologies described herein including but not limited to launching the social networking application program 118 for displaying the impact score 130, 130'. Computer executable instructions 136 may be loaded directly on the computer processor 102, may be any type of computer executable instructions 136, which may be in the form of a computer program, the program being composed in any suitable programming language or source code, such as C++, C, JAVA, JavaScript, HTML, XML, and other programming languages.

Computer executable instructions 136 may be stored (tangibly embodied) in the computer-readable storage medium 104 that may comprise of a storage device and include memory, such as, but not limited to, computer readable media, such as, but not limited to, a hard drive, solid state memory, i.e. solid state hard drives, flash memory, and the like, random access memory, e.g. CD-ROM, CD-R, CD-RW, DVD-ROM, DVD-R, DVD-RW, and the like. Stored on the computer readable-storage medium 104 may be the registered data file that includes registration information 138, i.e. registration of any one or more of networker's social networking website 108, 108' and accompanying passwords, weighted network score 120, weighted frequency score 122, weighted response score 124, weighted discussion score 126, weighted use score 128 and social networker's impact score 130. The information stored thereon may be retrieved from the computer readable-storage medium 104 using the computer processor 102.

Social networking application program 118 may be any type of software application comprising of computer executable instructions 136', readable and executable by the computer processor 102 that interfaces with third party social networking websites 108, 108' offering open application programming interfaces such that activities on the third-party social networking websites 108, 108' can be measured. In some embodiments, social networking application program 118 may comprise in part of a browser, such as for use on the mobile electronic device 136, or a similar browsing device, and may include a graphical user interface ("GUI") 140 displayed as webpages that a social networker may use to navigate the system 100, and for displaying the webpages with social networker's or his/her friends impact scores 128, 128' or activity posting 114, 114' thereon. Social networking application program 118 also operates as a social networking website 108 such that registered social networkers can post activity posting 114, 114' (vides, music clips, comments, responses, replies, likes, dislikes, discussion and the like) that will also be tabulated in the impact score 130. Accordingly, a registered social networker with the social networking application program 118 may generate a high impact score 130 by adding significant interactive posting 114, 114' on the social networking application's website 108.

The social networking application program 118 may be a standalone application designed to run on a mobile platform, such as a mobile electronic device 136 running an operating system 208 (as shown in FIG. 2), such as iOS™, Android™, Windows Mobile™, Blackberry™, and the like. Social networking application program 118 may be operative for an iPhone, any other "smart phone," mobile device, cellular phone, PDA, GPS or any other mobile device 102 capable of handling electronic transactions dealing with dynamic content, object, application, or software. The social networking application program 118 may be designed to run on its own social network platform, like FACEBOOK® or JUSTSYNC®. In some embodiments, social networking application program 118 may reside on a server computer and may be downloadable from the server computer or otherwise reside in the mobile electronic device's local computer readable storage medium 104'. For example, in one embodiment, the social networking application program 118 may be on a mobile electronic device 136 (such as an iPhone, Blackberry, or other "smart phone") and the full-sized software program may be on a computer, where communications may occur over a network 134 or directly, either wired or wirelessly.

In some embodiments, social networking application program 118 may reside on a server and/or on a mobile electronic device 136 or mobile electronic device 136', where the server computer 106 may have a software program residing in memory. A mobile electronic device 136' may have the social networking application program 118 residing in local memory or the social networking application program 118 maybe downloadable to the mobile electronic device 136' from the server. For example, in one embodiment, the social networking application program 118 may be on a mobile device 102 (such as an iPhone, Blackberry, or other 'smart phone') and the full-sized software program may be on a computer server, where communications may occur over a network 134 or directly, either wired or wirelessly.

Figure 2A:
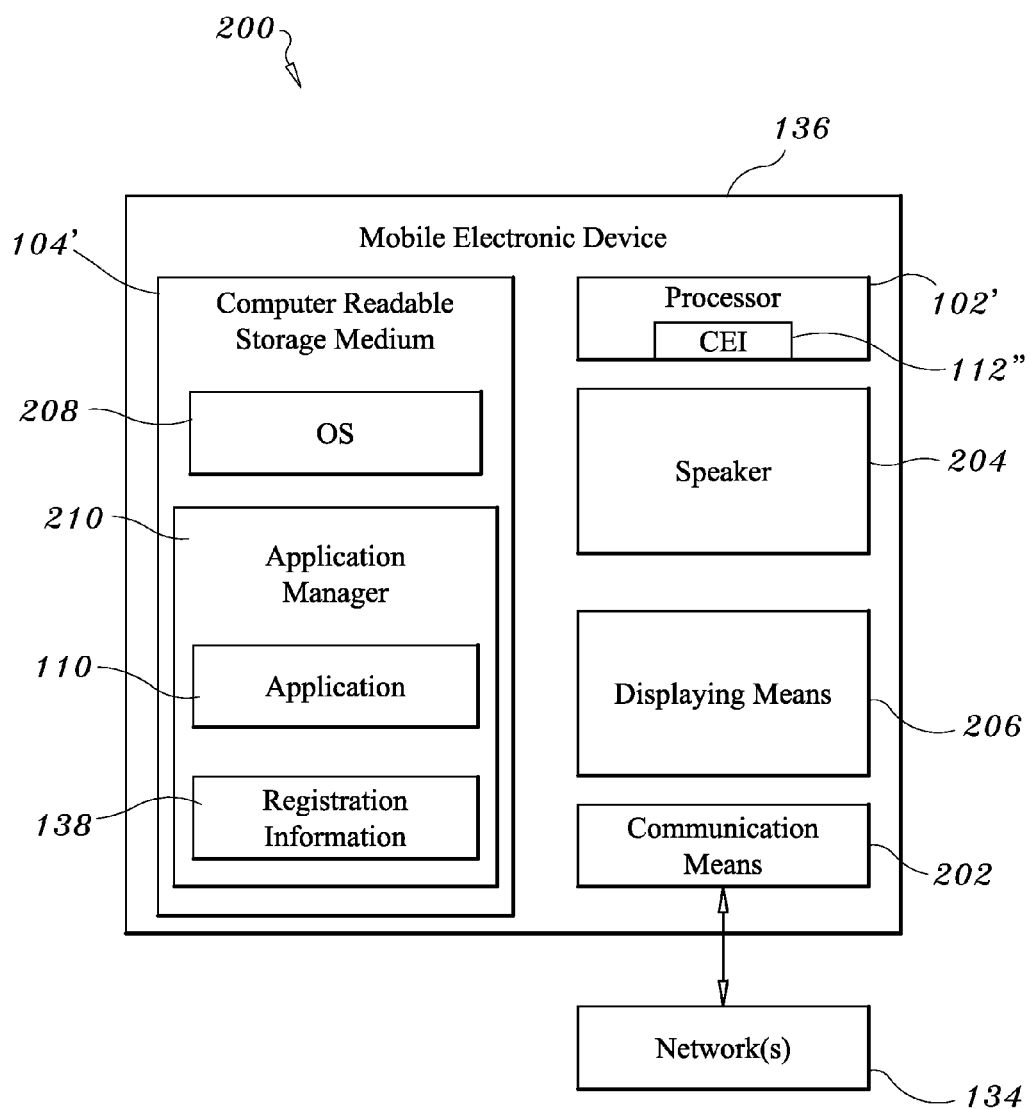
FIG. 2A shows a system in accordance with one embodiment.
Figure 2B:
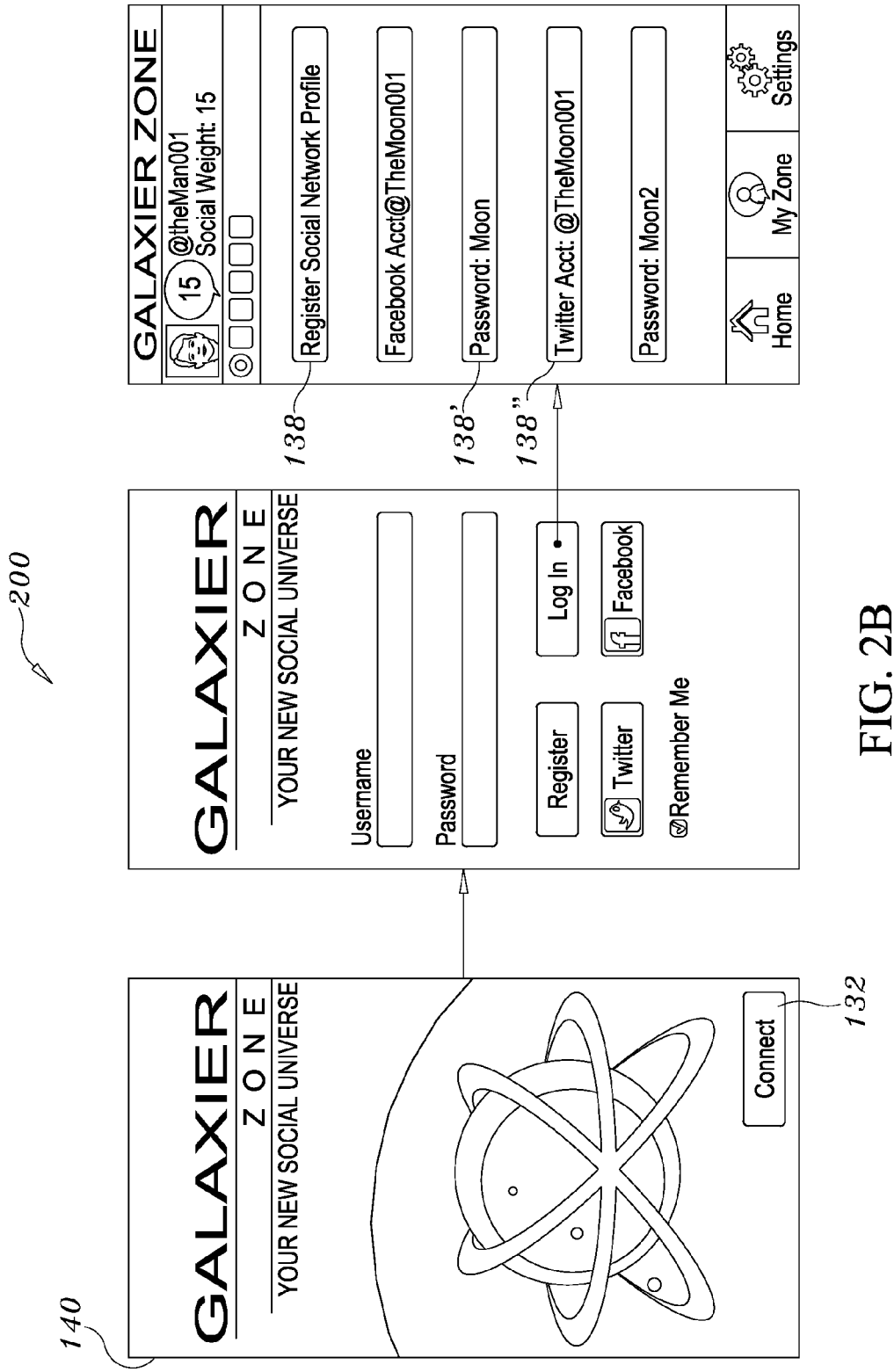
FIGS. 2B-2G show a system in use in accordance with one embodiment.

FIG. 2A shows a system 200 in accordance with an embodiment of the invention. System 200 includes an exemplary networked enabled mobile electronic device 136, i.e.

any type of device configured with means for communicating wirelessly and/or wired with other mobile electronic devices 134, 134', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 134, local area network, wide area network 134 such as the Internet, or any other type of network device that may communicate over a network 134.

Mobile electronic device 136 may include various hardware components, e.g. a computer processor 102', computer-readable storage medium 104 and one or more communication means 202. As previously discussed, computer processor 102 may be any type of processor, such as, but not limited to, a central processing unit (CPU), a microprocessor, a video processor, a front end processor, a coprocessor, a single-core central processor, a multi-core processor, and the like. Computer processor 102 may be programmed to launch the social networking application program 118 for interfacing with the varied third-party social networking websites 108, 108' for gathering empirical data, e.g. measuring the number of activity posting 114, 114', quality of the activity posting 114, 114', number of responses 116, 116' to the activity posting 114, 114' (e.g. followers, likes, dislikes, third party responses and social networker's replies, etc.), measuring the length of the discussion 118 emanating from the social networker's activity posting 114; measuring one or more third party's use of the social networker's activity posting 114 in for instance their own activity postings 110", 110''', and the like. In some embodiments, mobile electronic device 136 may have one or more programmable buttons (virtual or otherwise) or other visual indicators (e.g. icons) displayed thereon that allows social networker to launch and access the social networking application program 118 associated with its programmable button. When a social networker selects the programmable button (e.g. by touching a touchscreen, or selecting it using a pointing device, roller ball, arrow keys, or other controller), the social networker may access the application interface 118.

Mobile electronic device 136 is equipped with communication means 202 either electrically or mechanically connected to processor 102. In the case of electronic connections, the electronic connections may be wired and/or wireless. In some embodiments, communication means 202 may be a wireless communication means 202, which employ short range wireless protocol, such as, but not limited to, a radio frequency transceiver, a radio frequency receiver, and/or a radio frequency transmitter. In embodiments where the wireless communication means 202 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 202 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 202 are operative to transmit or receive electronic communications, i.e. social networker registration information 138, and the like via a short range wireless protocol, such as, but not limited to, a radio frequency receiver, a radio frequency transmitter, or a radio frequency transceiver.

In some embodiments, mobile electronic device 136 may include at least one computer readable-storage medium 104' either electrically or mechanically connected to the at least one computer processor 102. In the case of electronic connections, the electronic connections may be wired and/or wireless connections. Computer readable-storage medium 104' may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. The information stored thereon may be retrieved from computer readable-storage medium 104' using the mobile device's computer processor 102.

In some embodiments, mobile electronic device 136 also includes a speaker 204 for broadcasting the impact score 130, wherein the speaker 204 is of the like, kind and configuration as those generally used in the arts for mobile electronic devices 134, 134'. In some embodiments, processor 102 may be any type of processor, and may reside in a client computer, such as a PC, laptop, smart phone, tablet PC, iPad, notebooks, net books, and the like, a server computer, or on a cloud computer.

Computer processor 102' as positioned within the mobile electronic device 136 includes computer executable instructions 136', where the computer executable instructions 136' are operative to perform all the necessary functions for the system 100 and methods disclosed herein, including but not limited to launching the social networking application program 118 on the mobile electronic device 136. Computer executable instructions 136' may be loaded directly on the mobile device's processor 102, or may be stored in mobile device's computer readable-storage medium 104' that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer readable-storage medium 104' may be used to store information concerning the social networker's empirical data as gathered and the like. The computer executable instructions 136' may be any type of computer executable instructions 136', which may be in the form of a computer program, the program being composed in any suitable programming language or source code, such as C++, C, JAVA, JavaScript, HTML, XML, and other programming languages.

Mobile electronic device 136 may include any kind of displaying means 206, such as, but not limited to: a liquid crystal display ("LCD") screen, a light emitting diode ("LED") display, touchpad or touch screen display, and/or any other means known in the arts for emitting a visually perceptible output. Mobile device's processor 102' is in electronic communication with its displaying means 206. In other embodiments, displaying means 206 is wirelessly connected to processor 102. Displaying means 206 may include a control means, such as, but not limited to, a touch screen, a stylus, keyboard and the like. In some embodiments, displaying means 206 may be electronically connected to mobile electronic device 136 according to the hardware and software protocols that are known and used in the arts. Mobile device's computer processor 102' controls the displaying means 206, which is configured for displaying the GUI 140 such that social networkers may supply their registration information 138, interact with their registered social networking website 108, 108' or view his/her impact score 118 or their friend's impact scores 118', 118" within the social networking community.

Also stored on the memory means 106 may be an operating system 208, application manager 210, and the downloadable social networking application program 118. Social networking application program 118 may be an independent component or may be incorporated into the operating system 208. Social networking application program 118 is a computer-executable component, readable and executable by the computer processor 102, wherein the social networking application program 118 links to the Internet 204 to monitor social networker's activity posting 114, 114' on the various registered social networking websites 108, 108' for determining an aggregate impact score 130.

Application manager 210 comprises of computer-executable components that operate on the mobile device 102 and may be implemented in a variety of ways. Application manager 210 manages the various software applications on the mobile device 136. In one embodiment of the invention, application manager 210 may use one or more computer-executable components for interacting with social networking open application program interfaces. In another embodiment, social networking application program 118 is incorporated in application manager 210 to receive information from the input element, to communicate with, and/or to manage and control the operations of the social networking application program 118.

In some embodiments, social networking application program 118 may reside on a server and/or on a mobile electronic device 136, where the server computer 106 may have a software program residing in memory. A mobile electronic device 136' may have the social networking application program 118 residing in local memory or the social networking application program 118 maybe downloadable to the mobile electronic device 136' from the server. For example, in one embodiment, the social networking application program 118 may be on a mobile device 102 (such as an iPhone, Blackberry, or other 'smart phone') and the full-sized software program may be on a computer server, where communications may occur over a network 134 or directly, either wired or wirelessly.

In either embodiment, computer executable instructions 136' readable by processor 102', (i.e. the server's computer processor 102 or the mobile device's processor 102') are operative to launch the social networking application program 118 on the mobile electronic device 136 and for displaying a predetermined number of friends 132, 132' with the highest influence who are within the networker's social network. IN some embodiments, the user may define the predetermined number of friend's impact score 130, 130' that he'/she wishes to be displayed, while in other embodiments, the systems 100 & 200 determines how many will be displayed.

FIGS. 2B-2G show a system 200 in use in accordance with an embodiment of the invention. In order to have his/her activities calibrated as part of the impact score 130, i.e. social influence among their peers in their sphere of influence, social networker must first register with the social networking application program 118 and may identify and register at least one or more third-party social networks 108', 108 of his/her choice, e.g. FACEBOOK™, TWITTER™ and the like, for which activity posting 114, 114' for those third-party social networks 108', 108 will be measured and included in the calibration of his/her impact score 130. Social networker's participation and activity posting 114, 114' with the social networking application program 118 are included in the tabulation of the impact score 130.

Using the GUI 140, social networker can use a touchscreen or a programmable radio button 142, e.g. marked "Connect" on the screen to optionally register the social networking websites 108, 108' that the social networker would like to synchronize with the social network application 118 to acquire his/her social impact score 130 by providing his/her registration information 138. Registration information 138 may include but is not limited to the social networker's user-id and password and the name of the third-party website 108. At any point, social networker may disable a particular social networking website 108 account from the social networking application program 118 by simply unsubscribing the social network website 108 and thereafter activity posting 114, 114' to that social networking website 108 will not be included in any measurements for the social networker's impact score 130.

Figure 2C:
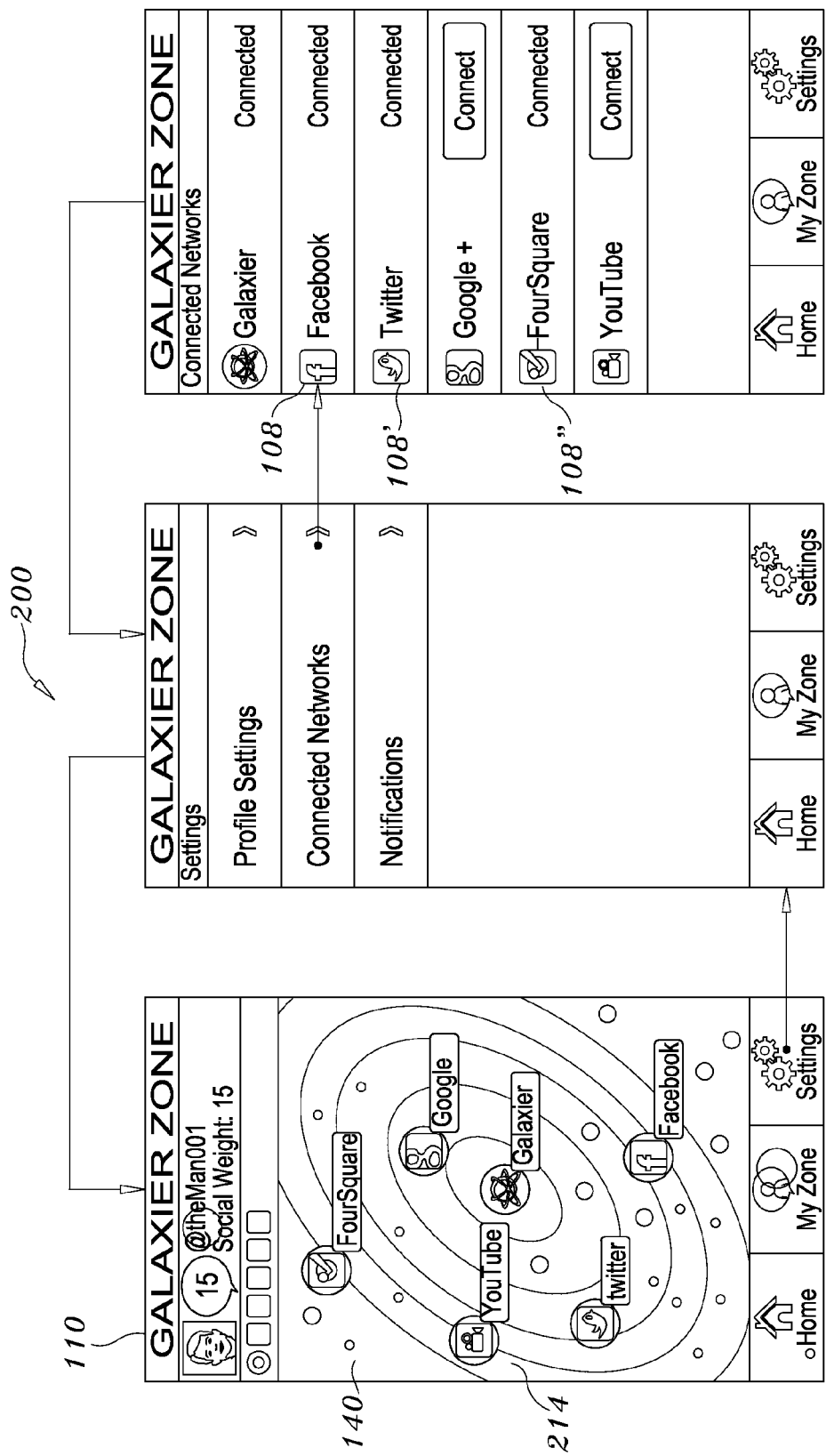
Figure 2D:
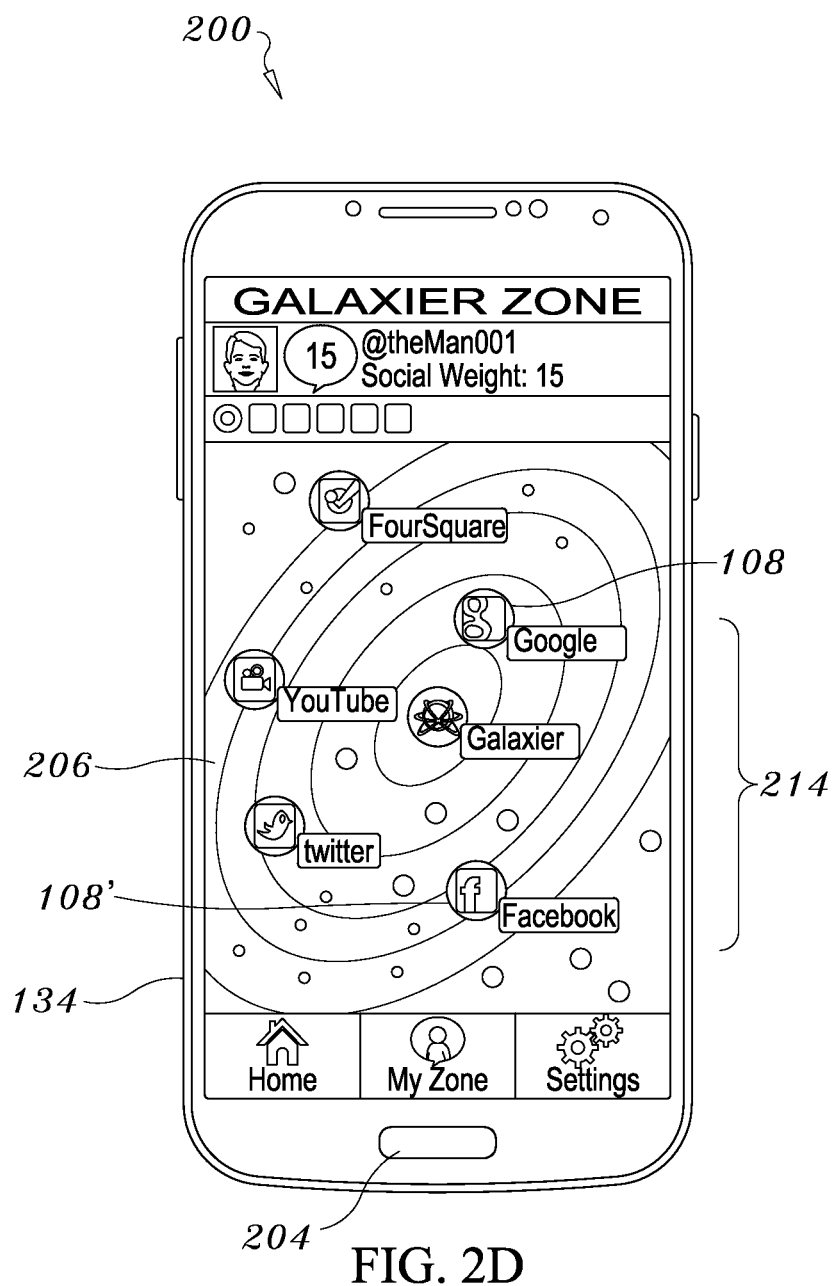
Figure 2E:
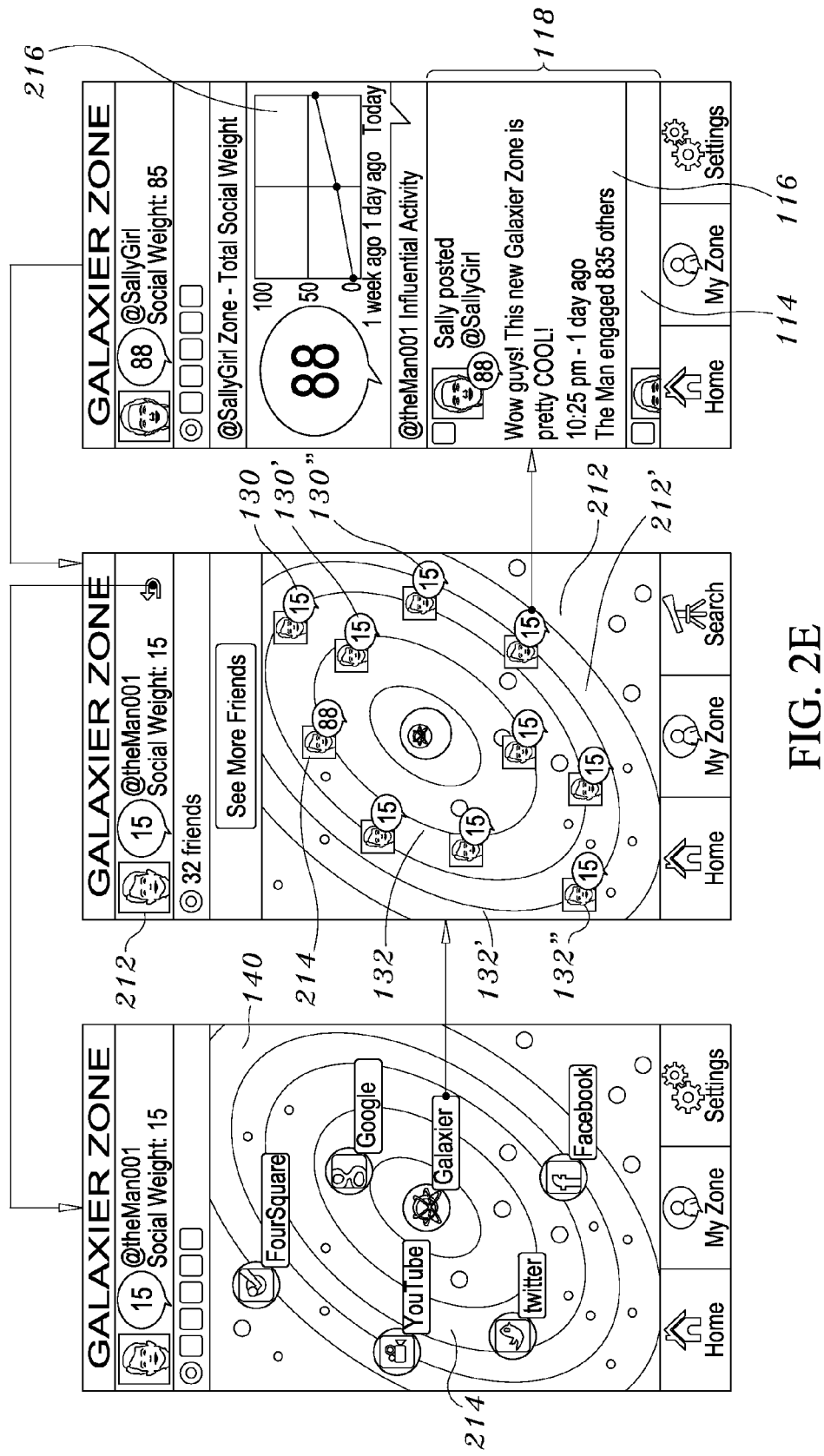

As seen in FIGS. 2C-2E, once social networker is logged into the social networking application program 118, social networker may access any registered third-party social networking website 108 from the social networking application program 118 to make activity posting 114, 114'. Additionally, user's account is tracked and he/she may view his/her impact score 130 as displayed by the social network application 118 on the mobile device's displaying means 206 with a user icon 212 with the impact score 130. The social networker's impact score 130 represents an aggregate of all qualitative and quantitative postings by the social networker's activity posting 114, 114' on the social networking application program 118 and the registered social networks 108, 108', i.e. posts, TWEETS™, re-TWEETS™, responses, replies, video clips, music clips, followers, i.e. consideration factors that are determinative of how influential the social networker is among his/her peers. In an exemplary embodiment, social networking application program is configured for displaying the registered social networking websites 108, 108' represented as an elliptical format of the planetary arrangement 214. In this manner, social networker at a glance can visually identify his/her registered social networking websites 108, 108'. This planetary arrangement 214 is dynamic and is only based on registered social networks 108, 108'. Thus for unsubscribed social networks 108, the planetary arrangement 214 would reorganize the change and display a modified elliptical format of social networks 108, 108' in a new planetary arrangement 214.

Figure 2F:
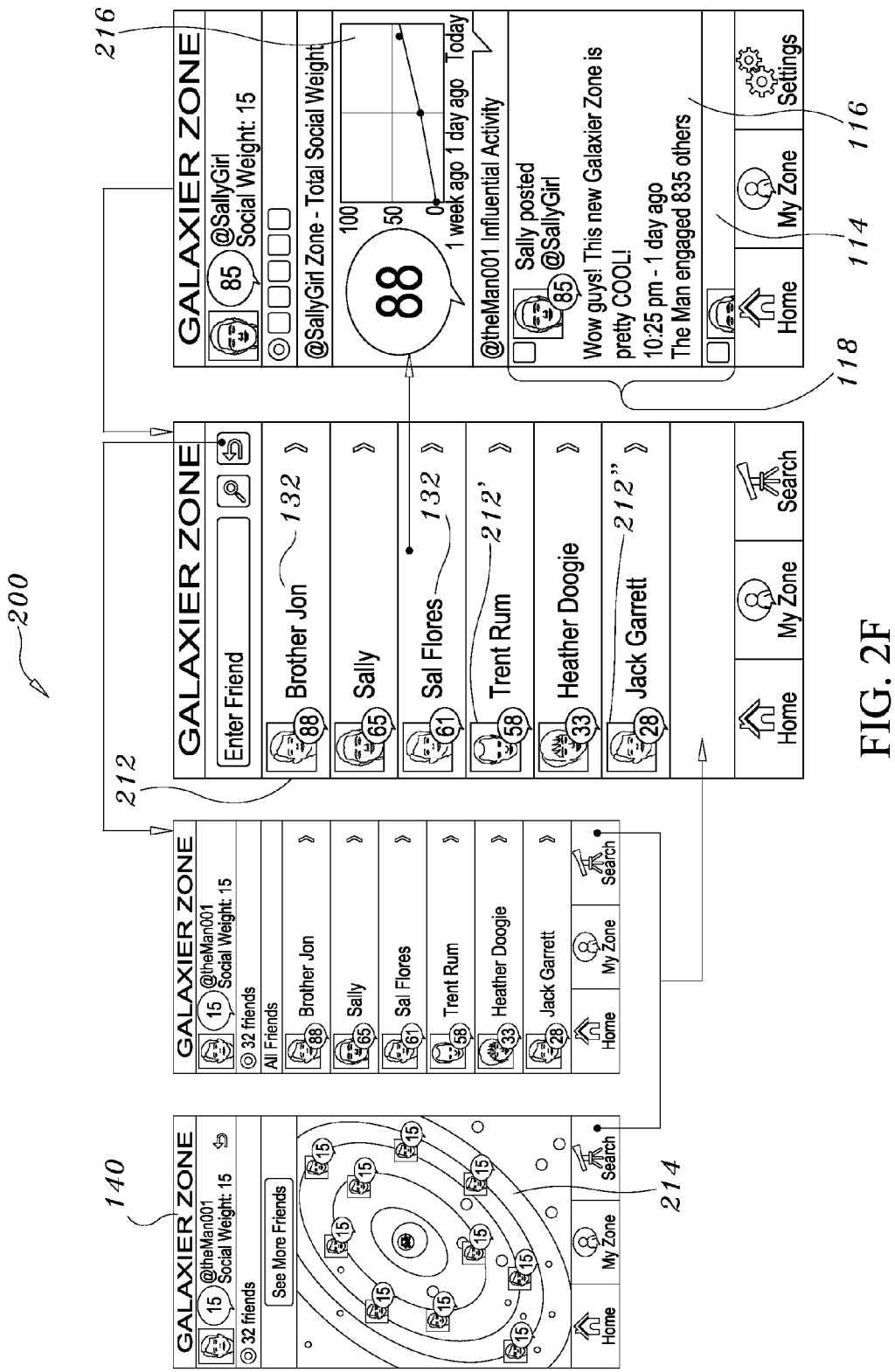

FIGS. 2E-2F show a display of social networker's friends 132, 132', 132" with their impact score 130, 130', 130" reflected thereon according to one embodiment of the system 100. Social networking application program 118 as shown herein depicts a planetary arrangement 214 for the display of the friends' impact score 130, 130', 130", with a predetermined number of the top most influential friends 132, 132', 132" within the social networker's sphere. In an exemplary embodiment, only the top 15 friends 132, 132', 132" with the highest impact score 130, 130', 130" are displayed in the elliptical format of the planetary arrangement 214 of the friends' user icons 212, 212', 212". By clicking any one user icons 212, 212, social networker may display in more detail a friend's impact score 130, 130' as per the social networker's user settings, which expands the view to include a graphical representation of the activity posting 114, 114', which in the exemplary embodiment charts activity posting 114, 114' from "1 week ago", "1 day ago" and "today" in a graph 216.

Figure 2G:
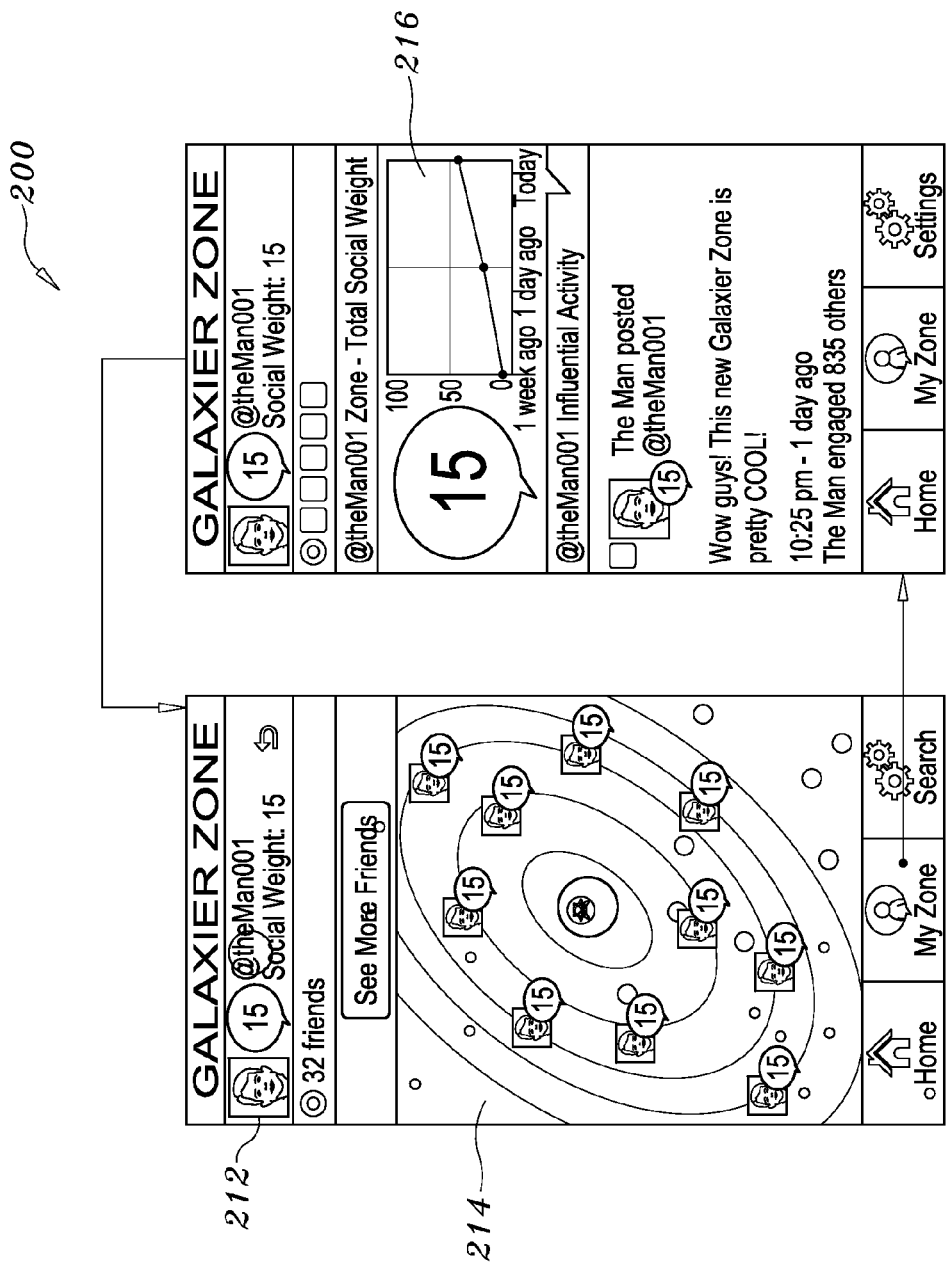

In an exemplary embodiment, impact score 130, 130' ranges from 1 to 100, with "1" being the weakest or least influential and "100" the strongest or most influential. If social networker wants to learn more about the details of his own impact score 130, social networker may click on any his/her user icon 212 to view a detailed screen of the influential activity posting 114, 114', e.g. uploads, discussions and the like that contributed to his/her impact score 130 as shown in FIG. 2G. In an exemplary embodiment, social networking application program 110 is configured for displaying the details for the impact score 130 on a graph 216 charting the activity posting 114, 114' as tabulated on a daily basis so that social networker can clearly see the spike in the activity posting 114, 114' attributable to "Today's" activity posting 114, 114', e.g. content, posts, music clips, video clips and the like. Because the social networking application program 118 operates like a social network, users can post comments, have discussions 114, 114', upload videos, etc., similar to other third-party social networking websites 108, 108' that will and can impact their impact score 130.

In some embodiments of the invention, any friend 132 within the social networker's social networking website 108 can be reviewed for their impact score 130 and his/her activities, even if the friend's icon 212 is not among the top predetermined number of influential friends 132, 132' that are displayed in the elliptical planetary arrangement 214. Social networker may also search for friends 132, 132' by name or any other identifier as used in the social networking website 108.

Figure 3A:
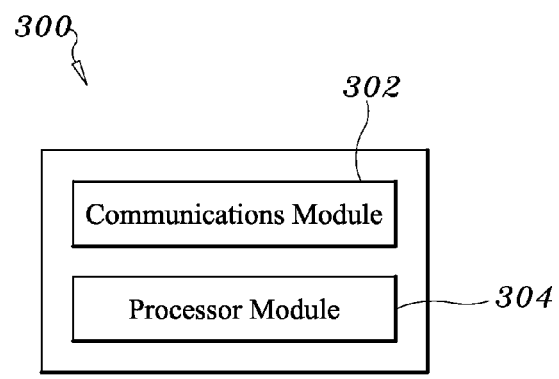
FIGS. 3A & 3B represent a system in accordance with one embodiment.
Figure 3B:
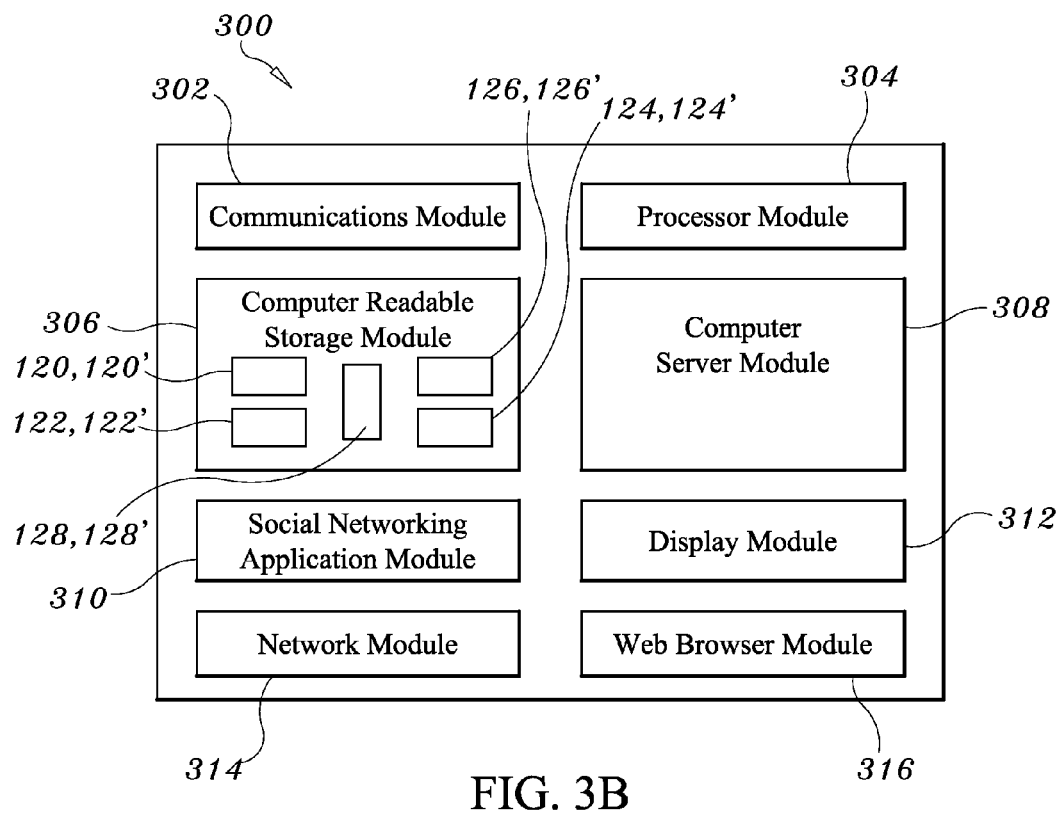

FIGS. 3A & 3B represent a system 300 in accordance with one embodiment. System 300 comprises of a communications module 302 and a computer processor module 304 configured for performing the system's 300 functions mentioned herein. The term "module," as used throughout this disclosure, may refer to a unit of distinct functionality that may be presented in software, hardware, or combinations thereof. When the functionality of a module is performed in any part through software, the module includes a machine readable medium.

Communications module 302 is configured for communicating over the computer network 134 to interact with third-party social networks 108, 108' to measure the variables for the impact score 130. In one embodiment, communications module 302 may comprise a hardware aspect, such as communications hardware. Such communications hardware may include, but is not limited to, a network adapter and/or card, a modem, and the other like communications means 132 that are well known and used in the arts and other future wireless protocol suitable for transmitting and receiving data. In yet another embodiment, communications module 302 may comprise both hardware and software aspects, such as those described directly above and elsewhere throughout the present disclosure. Communications module 302 is operative to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver.

Processor module 304 may comprise of a hardware aspect such as a computer processor 102, including, but not limited to, any of those previously described with reference to the embodiments described throughout the present disclosure. In another embodiment, processor module 304 may comprise of a software aspect, such as, but not limited to, a computer program, such as an operating system, matching software, word parsing software, word editor, multimedia player and the like. In yet another embodiment, processor module 304 may comprise both hardware and software aspects, such as those described directly above and elsewhere throughout the present disclosure. In some embodiments, processor module 304 may include software and hardware components to activate the social network application module 310 the functionality of the social networking application program 118.

As shown in FIG. 3B, system 300 comprises of a computer readable storage module 306 to store for example, registration information 138, 138' for the registered at least one or more social networkers, weighted network scores 116, 116', weighted frequency scores 120, 120', weighted response score 124, 122', weighted discussion scores 124, 124', weighted use score 128, 126', impact sores 128, 128' and the like. Computer readable storage module 306 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, computer readable storage module 306 may possess a software aspect, such as, but not limited to, database building software, file management software, and the like. In yet another embodiment, computer readable storage module 306 may comprise both hardware and software aspects, such as those described directly above and elsewhere throughout the present disclosure.

In another embodiment, system 300 further comprises a computer server module 308 to control the systems 100-300 functions discussed herein. Computer server module 308 may host the social network application module 310 for monitoring the registered social network websites 108, 108' and the social networker's activity posting 114, 114' to determine the social networker's influence on the registered social networks 108, 108'. The network application module 310 accesses the third-party social networking websites 108, 108' over a computer network 134, such as, but not limited to, a local area network (LAN), a wide area network (WAN), an integrated services digital network, a dial-up network, or other forms of a closed computer network 134. In an alternate embodiment of system 300, computer server module 308 provides for access over an open computer network 134, such as, but not limited to, a world-wide-web, or other forms of an open computer network 134. In one embodiment, computer server module 308 may comprise a hardware aspect, such as, but not limited to, a server computer. In another embodiment, computer server module 308 may comprise a software aspect, such as hosting computer software, including, but not limited to, a server operating system. In yet another embodiment, computer server module 308 may comprise both hardware and software aspects, such as those described directly above and elsewhere throughout the present disclosure.

System 300 includes the social network application module 310 that comprises a software aspect, e.g. a computer software program that resides on the systems 100, 200' computer processor 102, 102'. In another embodiment, the social network application module 310 may comprise of a hardware aspect. In yet another embodiment, the social network application module 310 may comprise both hardware and software aspects, such as those described directly above and elsewhere throughout the present disclosure.

Social network application module 310 comprises of software program comprising of computer executable instructions 132 readable and executable by the computer processor 102 and configured for: automatically collecting empirical data regarding the social networker's use and activity level for the registered at least one or more social networking websites 108, 108' that includes, but is not limited to, measuring for example, the frequency of an activity posting 114 by the social networker to the at least one or more registered social networking websites 108, 108' within a predetermined period; determining the number of responses 116, 116' to the activity posting 114; measuring the length, quantitative and qualitative discussion 118 emanating from the social networker's activity posting 114; measuring one or more third party's use of the social networker's activity posting 114; assigning individual weighted scores for each measured quantitative and qualitative empirical data, i.e. assigning a weighted network score 120 for the number of registered social networking websites 108, 108' registered with the social networking application program 118; assigning a weighted frequency score 122 to social networker based on the measured frequency of activity posting 114, 114'; assigning a weighted response score 124 for the number of measured responses 116, 116' to the social networker's activity posting 114, 114'; assigning a weighted discussion score 126 for the measured length, quantitative and qualitative discussion 118 emanating from the social networker's activity posting 114; and assigning a weighted use score 128 for the measured use of social network's activity posting 114, 114' by third parties; generating an impact score 130 by tabulating an aggregate of the individual weighted scores 116, 116' derived from the plurality of measured empirical data; posting the impact score 130 on a social networking website 108 viewable by the social networker and his/her community of friends 132, 132'; displaying any one of the following in an elliptical format in a planetary arrangement 214: registered social networking websites 108, 108' or the impact scores 130, 130' of social networker's friends 132, 132'; displaying friends' impact scores 130, 130' with identifying user icons 214, 214' from which any individual's friend's impact score 130 can be viewed for details; and displaying the details of the impact score 130 on a graph 216 charting the activity postings 114, 114'.

System 300 further comprises of a display module 312 configured for displaying the GUI 140, social networker's impact score 130, 130', impact scores 128'', 128''', 128'''' of social networker's friends 132, 132' in an elliptical format in a planetary arrangement 214 with identifying icons 212, 212' from which any individual's friend's impact score 130' can be viewed for details. Display module 312 may comprise a software aspect, such as display software, including, but not limited to, video software, video drivers, graphic display software, or other software suitable to display information. In another embodiment, the display module 312 may comprise a hardware aspect, such as display hardware, including, but not limited to, a video graphics card, a computer monitor, a projector, a television, other forms of viewing screens, or other hardware suitable to display computer data. In yet another embodiment, the display module 312 may comprise both hardware and software aspects, such as those described directly above and elsewhere throughout the present disclosure.

In one embodiment, system 300 further comprises of a network module 314 to access a computer network 134. In one embodiment, the network module 314 is operative to access a closed computer network 134, such as a local area network, a dial-up network, or another form of closed computer network. In another embodiment, the network module 314 is operative to access an open computer network 134, such as a world-wide-web, or any other form of open computer network. In one embodiment, the network module 314 may comprise a software aspect, such as network software, including, but not limited to, networking software such as those produced by CISCO SYSTEMS®, SUN MICROSYSTEMS®, and ORACLE®. In another embodiment, the network module 314 may comprise a hardware aspect, such as network hardware, including, but not limited to, a network adapter, a wireless network adapter, a modem, and other hardware capable of accessing and/or communicating through a network. In yet another embodiment, the network module 314 may comprise both hardware and software modules, such as those described directly above and elsewhere throughout the present disclosure.

As shown, system 300 may comprise of a web browser module 316 operative to transmit, locate, retrieve and/or receive over the Internet information. In one embodiment, web browser module 316 may comprise a software aspect, such as a computer program, including, but not limited to, MICROSOFT INTERNET EXPLORER®, NETSCAPE NAVIGATOR®, OPERA®, MOSAIC®, SAFARI®, CHROME®, or any other form of computer software or program capable of browsing a computer network 134, such as the world-wide-web. In another embodiment, web browser module 316 may comprise a hardware aspect, such as a personal computer, including but not limited to, a web pc, a laptop, an internet station, a personal digital assistant, a smart phone, and the like. In yet another embodiment, web browser module 316 may comprise both hardware and software aspects, such as those described directly above and elsewhere throughout the present disclosure.

Methods

Figure 4:
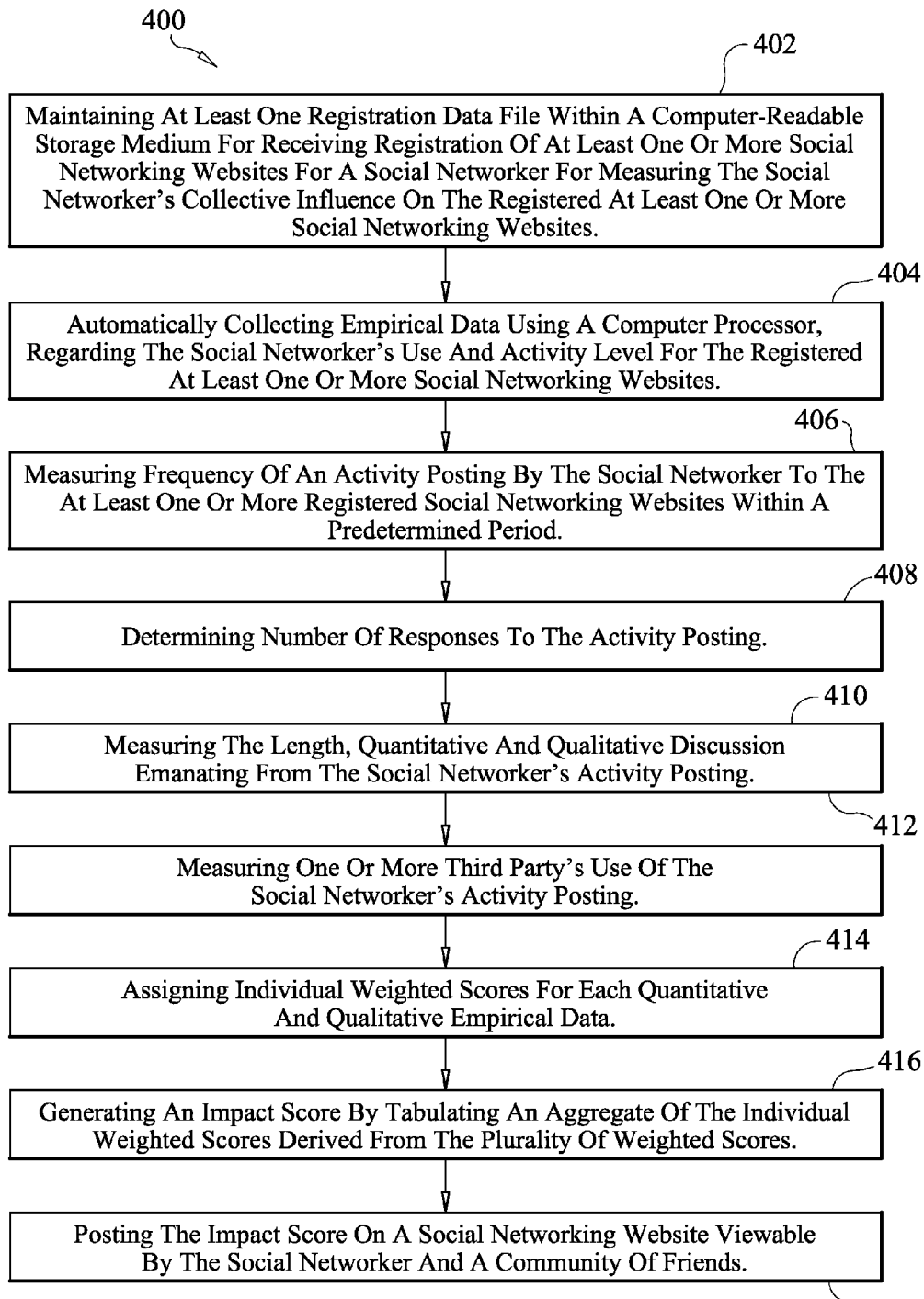
FIG. 4 shows a block diagram depicting a method in accordance with one embodiment.

FIG. 4 is an exemplary method 400 of the invention according to one embodiment. The social networking application program 118 automatically collects empirical data regarding the social networker's use and activity level on the registered at least one or more registered social networking websites 108, 108' to generate an empirical impact score 130 representing the social networker's collective influence on the one or more registered social networking websites 108, 108'.

Computer-implemented method 400 comprises of maintaining at least one registration data file 106 within a computer-readable storage medium 104 for receiving registration of at least one or more social networking websites 108, 108' for a social networker, for measuring the social networker's collective influence on the registered at least one or more social networking websites 108, 108' (step 402).

Method 400 further comprises using the social networking application program 118 for automatically collecting empirical data using a computer processor 102, regarding the social networker's use and activity level for the registered at least one or more social networking websites 108, 108' (step 404), for example, measuring the frequency of an activity posting 114 by the social networker to the at least one or more registered social networking websites 108, 108' within a predetermined period (step 406), wherein the predetermined period may be set by the social networking application program 118 or in some embodiments set by the social networker. In either event, the predetermined period may include periods of days, months or years thereby allowing social networker to make activity posting 114, 114 and sufficient time for the social networker to develop a following and/or gain influence.

Method 400 also comprises of using the social networking application program 118 for determining number of responses 112, 122' to the activity posting 114 (step 408). Such responses 112 include but are not limited to likes, dislikes, comments, TWEETS™ and the like. Method 400 also comprises using the social networking application program 118 for measuring the length, quantitative and qualitative discussion 118 emanating from the social networker's activity posting 114, 110' (step 410) where for example, the social network application 118 takes various factors into consideration, e.g. number of likes, dislikes, ratio of likes to dislikes of social networker's activity posting 114; TWEETS™, re-TWEETS™ and the like to determine the weighted discussion score 126 that is aggregated into the final impact score 130.

Method 400 further comprises using the social networking application program 118 for measuring one or more third party's use of the social networker's activity posting 114 (step 412) and assigning individual weighted scores for each quantitative and qualitative empirical data (step 414) by generating an impact score 130 by tabulating an aggregate of the individual weighted scores derived from the plurality of weighted scores (step 416); and posting the impact score 130 on a social networking website 108 viewable by the social networker and a community of friends 132, 132' (step 418).

Once social networking application program 118 measures the various factors for the impact score 130 it assigns individual weighted scores for each quantitative and qualitative empirical data for example, the computer processor 102 is configured for automatically assigning a weighted network score 120 for the number of registered social networking websites 108, 108'. Some social networking websites 108, 108' are more popular than others and as such registration of popular social networking websites 108, 108', e.g. FACEBOOK™ may garner a higher weighted network score 120 than e.g. MYSPACE™. In this manner, additional elements are taken into consideration for assigning the weighted network score 120 other than the number of social networking websites 108, 108' registered.

Social networking application program 118 is also configured for assigning a weighted frequency score 122 for the measured frequency of activity posting 114, 114' within a predefined period of time, e.g. number of days. Here too, several factors are also taken into consideration, e.g. activity posting 114, 114' on holidays, where most social networkers may either spend quality time with families or submit activity posting 114, 114' to friends 132, 132'. Also factored into the weighted frequency score 122 are expected activity posting 114, 114' during for example natural disasters, exciting news, events of public import, e.g. 911 in New York, for which one would expect a social networker to file an activity posting 114, 110' and for his/her friends 130, 130 to spark a discussion 118. Absent such activity posting 114, 110', the weighted frequency score 122 may be negatively affected.

Method 400 further comprises of using the social networking application program 118 for assigning a weighted response score 124 for the number of responses 112,112' to the social networker's activity posting 114, 110' and assigning a weighted discussion score 126 based on factors that include but are not limited to the length, quantitative and qualitative content of the discussion 118 emanating from the social networker's activity posting 114. The social networking application program 118 also operates as social networking website 108 and as such any activity posts 110, 110' and discussions ensuing therefrom are also included in any tabulations of the social networker's impact score 130. Social networking application program 118 is also configured for assigning a weighted use score 128 for measured third party's use of the social networker's activity postings. For example re-TWEETS™, copied activity posting 114, 114', e.g. video clips, articles, movie clips, comments and the like when copied by others are monitored and noted and are factored into the weighted use score 128. The more third-parties use social networker's activity posting 114, 114' the higher his/her weighted use score 128 will be.

Method 400 also comprises using the social networking application program 118 for displaying friend's impact score 130 and the details comprising the impact score 130 such that an individual may learn, why a friend 132 may have more or less influence in their social sphere than social networker. In some embodiments, the details comprising the impact score 130 are displayed in a graph 216 charting the activity posting 114, 114' during the predetermined period of time.

In some embodiments, the social networking application program 118 is also configured for displaying the registered social networks 108, 108' or the impact score 130, 130' of social networker's friends 132, 132' in an elliptical format in a planetary arrangement 214 with identifying icons 212, 212' from which any individual's friend's impact score 130' can be viewed for details.

Hardware and Operating Environment

This section provides an overview of exemplary hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
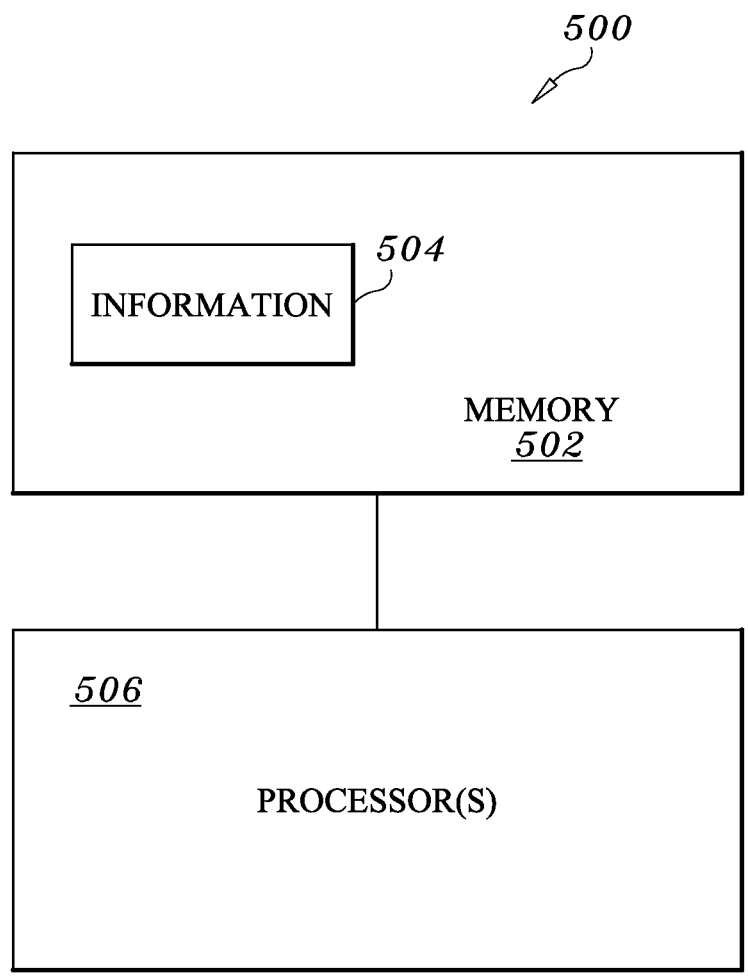
FIG. 5 shows a block diagram depicting an article in accordance with one embodiment.

FIG. 5 is a block diagram representing an article according to various embodiments. Such embodiments may comprise a computer, a memory system, a magnetic or optical disk, some other storage device, or any type of electronic device or system. The article 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both) which, when accessed, results in a machine (e.g., the processor(s) 502) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A computerized system comprising:
    (a) a computer processor;
    (b) a computer-readable storage medium maintaining at least one registration data file for receiving registration of at least one or more social networking websites for a social networker, for measuring the social networker's collective influence on the registered at least one or more social networking websites, said computer-readable storage medium being in communication with said computer processor;

(c) a social networking application program comprising computer executable instructions readable and executable by the computer processor and configured for automatically collecting empirical data regarding the social networker's use and activity level for the at least one or more registered social networking websites that includes, but is not limited to, measuring frequency of an activity posting by the social networker to the at least one or more registered social networking websites within a predetermined period; determining number of responses to the activity posting; measuring the length, quantitative and qualitative discussion emanating from the social networker's activity posting; measuring one or more third party's use of the social networker's activity posting; assigning individual weighted scores for each quantitative and qualitative empirical data; generating an impact score by tabulating an aggregate of the individual weighted scores derived from the plurality of weighted scores; and posting the impact score on a social networking website viewable by the social networker and a community of friends.

2. The computerized system according to claim 1, wherein the social networking application program is configured for automatically assigning a weighted network score for number of registered social networking websites.

3. The computerized system according to claim 1, wherein the social networking application program is configured for assigning a weighted frequency score for the measured frequency of activity postings.

4. The computerized system according to claim 1, wherein the social networking application program is configured for assigning a weighted response score for the number of responses to the social networker's activity posting.

5. The computerized system according to claim 1, wherein the social networking application program is configured for assigning a weighted discussion score based on the length, quantitative and qualitative discussion emanating from the social networker's activity posting.

6. The computerized system according to claim 1, wherein the social networking application program is configured for assigning a weighted use score for measured third party's use of the social networker's activity postings.

7. The computerized system according to claim 1, wherein the social networking application program is configured for displaying any one of the following in an elliptical format in a planetary arrangement: registered social networks or the impact scores of social networker's friends.

8. The computerized system according to claim 1, wherein the social networking application program is configured for displaying friends' impact scores with identifying icons from which any individual's friend's impact score can be viewed for details.

9. The computerized system according to claim 8, wherein the computer processor is configured for displaying the details of the impact score on a graph charting the activity postings.

10. A computer-implemented method comprising:
(a) maintaining at least one registration data file within a computer-readable storage medium for receiving registration of at least one or more social networking websites for a social networker for measuring the social networker's collective influence on the registered at least one or more social networking websites;

(b) automatically collecting empirical data using a computer processor, regarding the social networker's use and activity level for the registered at least one or more social networking websites;

(c) measuring frequency of an activity posting by the social networker to the at least one or more registered social networking websites within a predetermined period;

(d) determining number of responses to the activity posting;

(e) measuring the length, quantitative and qualitative discussion emanating from the social networker's activity posting; measuring one or more third party's use of the social networker's activity posting;

(f) assigning individual weighted scores for each quantitative and qualitative empirical data;

(g) generating an impact score by tabulating an aggregate of the individual weighted scores derived from the plurality of weighted scores; and (h) posting the impact score on a social networking website viewable by the social networker and a community of friends.

11. The computer-implemented method according to claim 10, further comprising automatically assigning a weighted network score for the registered social networking websites.

12. The computer-implemented method according to claim 10, further comprising assigning a weighted frequency score for the measured frequency of activity postings.

13. The computer-implemented method according to claim 10, further comprising assigning a weighted response score for the number of responses to the social networker's activity posting.

14. The computer-implemented method according to claim 10, further comprising assigning a weighted discussion score based on the length, quantitative and qualitative discussion emanating from the social networker's activity posting.

15. The computer-implemented method according to claim 10, further comprising assigning a weighted use score for measured third party's use of the social networker's activity postings.

16. The computer-implemented method according to claim 10, further comprising displaying any one of the following in an elliptical format in a planetary arrangement: registered social networks or the impact scores of social networker's friends.

17. The computer-implemented method according to claim 10, further comprising displaying a friend's impact score with identifying icons from which any individual's friend's impact score can be viewed for details.

18. The computer-implemented method according to claim 17, further comprising displaying the details of the impact score on a graph charting the activity postings.

19. A system comprising of:
(a) a computer processor module;
(b) a computer-readable storage module maintaining at least one registration data file for receiving registration of at least one or more social networking websites for a social networker, for measuring the social networker's collective influence on the registered at least one or more social networking websites, said computer-readable storage medium being in communication with said computer processor;
(c) the social networking application module configured for automatically collecting empirical data regarding the social networker's use and activity level for the at least one or more registered social networking websites that includes, but is not limited to, measuring frequency of an activity posting by the social networker to the at least one or more registered social networking websites within a predetermined period; determining number of responses to the activity posting; measuring the length, quantitative and qualitative discussion emanating from the social networker's activity posting; measuring one or more third party's use of the social networker's activity posting; assigning individual weighted scores for each quantitative and qualitative empirical data; generating an impact score by tabulating an aggregate of the individual weighted scores derived from the plurality of weighted scores; and posting the impact score on a social networking website viewable by the social networker and a community of friends.

20. The system according to claim 19, wherein the social networking application module is further configured for automatically assigning a weighted network score for number of registered social networking websites.

21. The system according to claim 19, wherein the social networking application module is further configured for assigning a weighted frequency score for the measured frequency of activity postings.

22. The system according to claim 19, wherein the social networking application module is further configured for assigning a weighted response score for the number of responses to the social networker's activity posting.

23. The system according to claim 19, wherein the social networking application module is further configured for assigning a weighted discussion score based on the length, quantitative and qualitative discussion emanating from the social networker's activity posting.

24. The system according to claim 19, wherein the social networking application module is further configured for assigning a weighted use score for measured third party's use of the social networker's activity postings.

25. The system according to claim 19, wherein the social networking application module is further configured for displaying any one of the following in an elliptical format in a planetary arrangement: registered social networks or the impact scores of social networker's friends.

26. The system according to claim 19, wherein the social networking application module is further configured for displaying a friend's impact score with identifying icons from which any individual's friend's impact score can be viewed for details.

27. The system according to claim 19, wherein the social networking application module is further configured for displaying the details of the impact score on a graph charting the activity postings.

\* \* \* \* \*